(12) United States Patent
Sasaki

(10) Patent No.: US 10,113,614 B2
(45) Date of Patent: Oct. 30, 2018

(54) DOOR OPENING/CLOSING DEVICE

(71) Applicant: MITSUI KINZOKU ACT CORPORATION, Kanagawa (JP)

(72) Inventor: Kazuyuki Sasaki, Kanagawa (JP)

(73) Assignee: Mitsui Kinzoku Act Corporation, Kanagawa (JP)

(*) Notice: Subject to any disclaimer, the term of this patent is extended or adjusted under 35 U.S.C. 154(b) by 50 days.

(21) Appl. No.: 14/770,817

(22) PCT Filed: Jun. 25, 2014

(86) PCT No.: PCT/JP2014/066895
§ 371 (c)(1),
(2) Date: Aug. 26, 2015

(87) PCT Pub. No.: WO2015/173973
PCT Pub. Date: Nov. 19, 2015

(65) Prior Publication Data
US 2017/0059002 A1    Mar. 2, 2017

(30) Foreign Application Priority Data
May 14, 2014 (JP) .................................. 2014-100898

(51) Int. Cl.
*F16H 1/46* (2006.01)
*B60J 5/10* (2006.01)
(Continued)

(52) U.S. Cl.
CPC .................. *F16H 1/46* (2013.01); *B60J 5/10* (2013.01); *B60J 5/106* (2013.01); *E05F 15/63* (2015.01);
(Continued)

(58) Field of Classification Search
CPC .. F16H 1/46; E05F 15/63; B60J 5/106; E05Y 2201/72; E05Y 2900/546
See application file for complete search history.

(56) References Cited

U.S. PATENT DOCUMENTS 4,106,366 A    8/1978 Altenbokum et al.
4,535,653 A    8/1985 Coburn
(Continued)

FOREIGN PATENT DOCUMENTS

CN    1928307 A    3/2007
CN    103742082 A   4/2014
(Continued)

OTHER PUBLICATIONS

Extended European Search Report issued in corresponding European Patent Application No. 14882793.4 dated Nov. 8, 2016.
(Continued)

*Primary Examiner* — Huan Le
(74) *Attorney, Agent, or Firm* — McDermott, Will & Emery LLP

(57) ABSTRACT

A door opening/closing device includes: a motor; and an output shaft arranged on a line extending from an axial center of the motor, power of the motor being transmitted to the output shaft via a deceleration mechanism, the door opening/closing device opening and closing a door via the output shaft by driving the motor. Positional deviation on both end surfaces of the output shaft is set to equal to or higher than $\phi 0.01$ and equal to or lower than $\phi 0.1$.

8 Claims, 11 Drawing Sheets

(51) Int. Cl.
  *H02K 7/10*    (2006.01)
  *E05F 15/63*   (2015.01)
  *F16H 21/40*   (2006.01)
  *H02K 7/00*    (2006.01)
  *H02K 7/116*   (2006.01)

(52) U.S. Cl.
  CPC ............ *F16H 21/40* (2013.01); *H02K 7/003* (2013.01); *H02K 7/10* (2013.01); *H02K 7/116* (2013.01); *E05Y 2201/72* (2013.01); *E05Y 2900/546* (2013.01)

(56) References Cited

U.S. PATENT DOCUMENTS

| | | | |
|---|---|---|---|
| 2003/0130758 A1 | 7/2003 | Hirano et al. | |
| 2007/0051046 A1 | 3/2007 | Yoshida | |
| 2013/0269305 A1* | 10/2013 | Wang | A01D 34/00 56/14.7 |

FOREIGN PATENT DOCUMENTS

| | | |
|---|---|---|
| JP | 07-260464 A | 10/1995 |
| JP | 2001-260671 A | 9/2001 |
| JP | 2003-177811 A | 6/2003 |
| JP | 2005-082019 A | 3/2005 |
| JP | 2005-213762 A | 8/2005 |
| JP | 2013-221622 A | 10/2013 |

OTHER PUBLICATIONS

Office Action issued in corresponding Chinese Patent Application No. 201480022262.6 dated Aug. 11, 2016, 5 pgs.

Japanese Office Action issued in corresponding Japanese Patent Application No. 2014-100898, dated Feb. 20, 2018, with English Translation.

Japanese Office Action issued in corresponding Japanese Patent Application No. 2014-100898, dated Aug. 14, 2018, with English Translation.

* cited by examiner

← FRONT SIDE OF VEHICLE  REAR SIDE OF VEHICLE →

DOOR OPENING/CLOSING DEVICE

CROSS-REFERENCE TO RELATED APPLICATIONS

The subject application is the U.S. National Phase of PCT/JP2014/066895 filed Jun. 25, 2015, which claims priority to Japanese Patent Application No. 2014-100898 filed May 14, 2014. The subject matter of each is incorporated herein by reference in entirety.

FIELD

The present invention relates to a door opening/closing device.

BACKGROUND

Some doors of vehicles, such as hatchback doors and sliding doors, can be opened and closed by door opening/closing devices besides by a manual opening and closing operation (refer to Patent Literature 1, for example). Some of the door opening/closing devices assist the manual opening and closing operation, thereby reducing an operator's burden.

Such a door opening/closing device includes an electric motor and an output shaft to which power of the electric motor is transmitted via a deceleration mechanism. In the door opening/closing device, the output shaft is rotated by the drive of the electric motor. As a result, the power of the electric motor is transmitted along the axial center of the output shaft, making it possible to move a door provided to a vehicle main body in an opening direction or a closing direction.

CITATION LIST

Patent Literature

Patent Literature 1: Japanese Patent Application Laid-open No. 2005-082019

SUMMARY

Technical Problem

It is necessary for such a door opening/closing device to have a small loss in the power of the motor when opening and closing the door, that is, to have high output efficiency. Specifically in the deceleration mechanism that transmits the power of the motor along the axial center of the output shaft and in the output shaft, the axial centers of members arranged on the axial center of the output shaft to transmit the power preferably coincide with the axial center of the output shaft highly accurately.

In view of the circumstance described above, the present invention aims to provide a door opening/closing device having high output efficiency.

Solution to Problem

To solve the above-described problem and achieve the above-described object, a door opening/closing device according to the present invention includes: a motor; and an output shaft arranged on a line extending from an axial center of the motor, power of the motor being transmitted to the output shaft via a deceleration mechanism, the door opening/closing device opening and closing a door via the output shaft by driving the motor. Positional deviation on both end surfaces of the output shaft is set to equal to or higher than $\phi 0.01$ and equal to or lower than $\phi 0.1$.

In the door opening/closing device according to the present invention, the deceleration mechanism includes a planetary gear mechanism having a sun gear arranged on a line extending from an axial center of the output shaft, and positional deviation or coaxiality of an axial center on at least one of end surfaces of the sun gear with respect to an axial center on a datum plane orthogonal to an axial center of the sun gear is set to equal to or higher than $\phi 0.01$ and equal to or lower than $\phi 0.1$.

In the door opening/closing device according to the present invention, an eccentric distance between a position of center of gravity when the motor, the deceleration mechanism, and the output shaft are assembled and the axial center of the output shaft is set smaller than two-tenths of the diameter of the output shaft.

The door opening/closing device according to the present invention further includes: an arm configured to connect the door and the door opening/closing device. An eccentric distance between the position of center of gravity when the motor, the deceleration mechanism, the output shaft, and the arm are assembled and the axial center of the output shaft is set smaller than two-tenths of the diameter of the output shaft.

In the door opening/closing device according to the present invention, the deceleration mechanism includes a first planetary gear mechanism, a second planetary gear mechanism, and a third planetary gear mechanism that are configured to decelerate the power of the motor gradually and rotate the output shaft. An eccentric distance between a position of center of gravity when the motor and the first planetary gear mechanism are assembled and the axial center of the output shaft is set smaller than one-tenth of the diameter of the output shaft, and another eccentric distance between a position of center of gravity when the second planetary gear mechanism and the third planetary gear mechanism are assembled and the axial center of the output shaft is set smaller than one-tenth of the diameter of the output shaft.

Advantageous Effects of Invention

The present invention can provide a door opening/closing device having high output efficiency by setting the positional deviation on both end surfaces of an output shaft to equal to or higher than $\phi 0.01$ and equal to or lower than $\phi 0.1$.

DESCRIPTION OF EMBODIMENTS

Figure 1A:
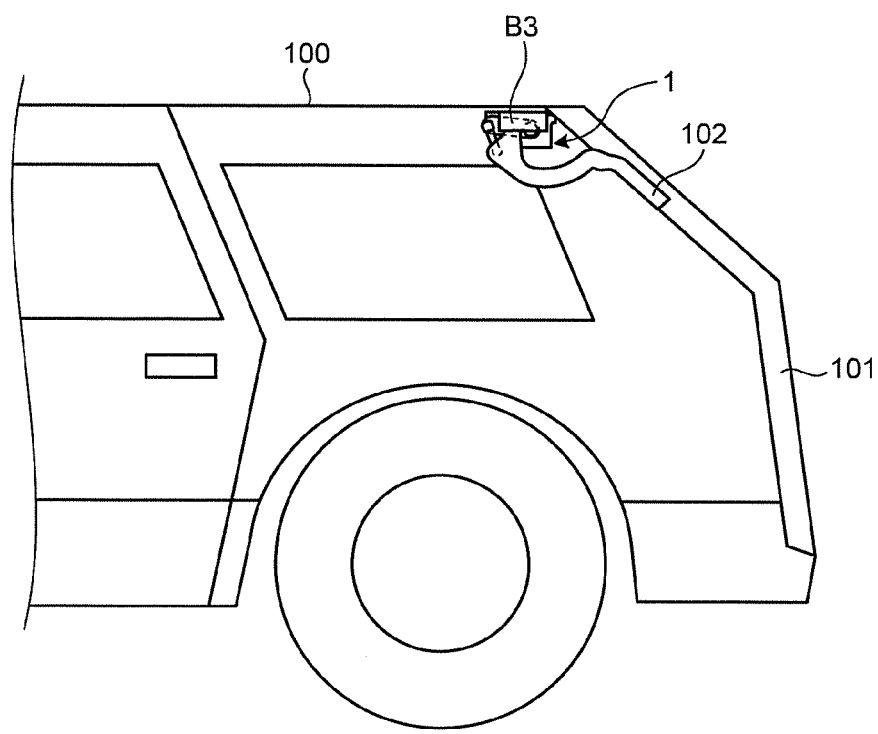
FIG. 1A is a schematic of an installation example where a door opening/closing device according to the present embodiment is used to open and close a hatchback door.

Exemplary embodiments of a door opening/closing device according to the present invention are described below with reference to the accompanying drawings. The embodiments are not intended to limit the invention. In the drawings, like or corresponding components are denoted by like reference numerals as appropriate. The drawings are schematic illustration, and it is necessary to note that the relation between the sizes of components, the ratio between the components, and other elements may be different from those in an actual configuration. The relation between the sizes and the ratio may also be different between the drawings.

In the present specification, the positional deviation and the coaxiality indicate that the positional tolerance and the coaxiality tolerance, respectively, are values specified by the geometrical tolerance of "JIS B0021: 1998 Geometrical product specifications (GPS)—Geometrical tolerancing—Tolerancing of form, orientation, location and run-out".

Embodiment

Figure 1B:
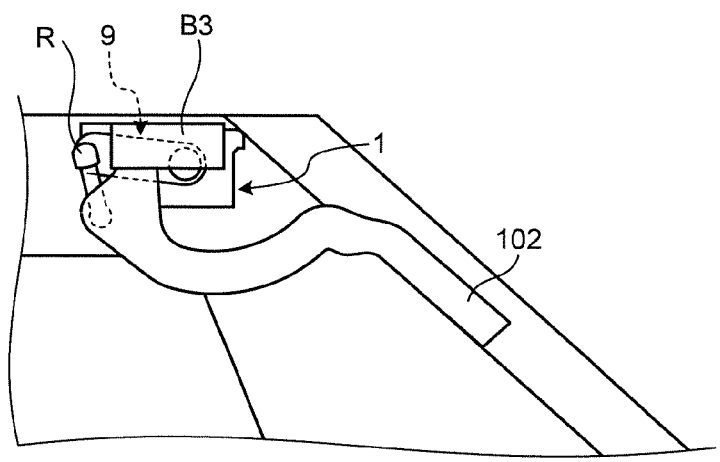
FIG. 1B is a schematic of the installation example where the door opening/closing device according to the present embodiment is used to open and close the hatchback door.
Figure 2A:
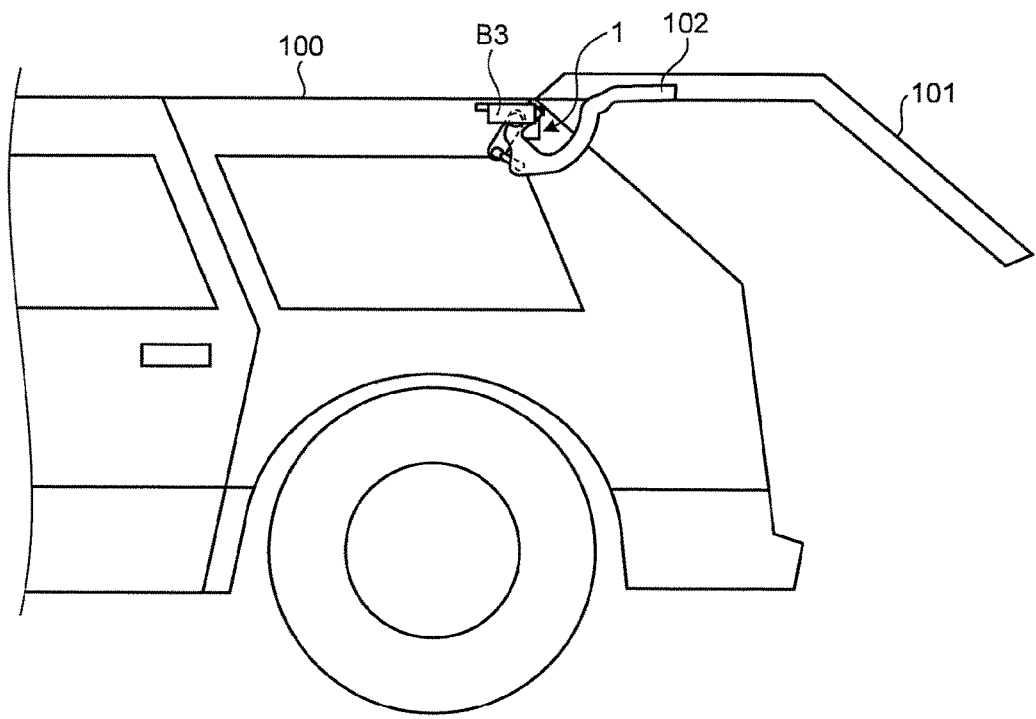
FIG. 2A is a schematic of the installation example where the door opening/closing device according to the present embodiment is used to open and close the hatchback door.
Figure 2B:
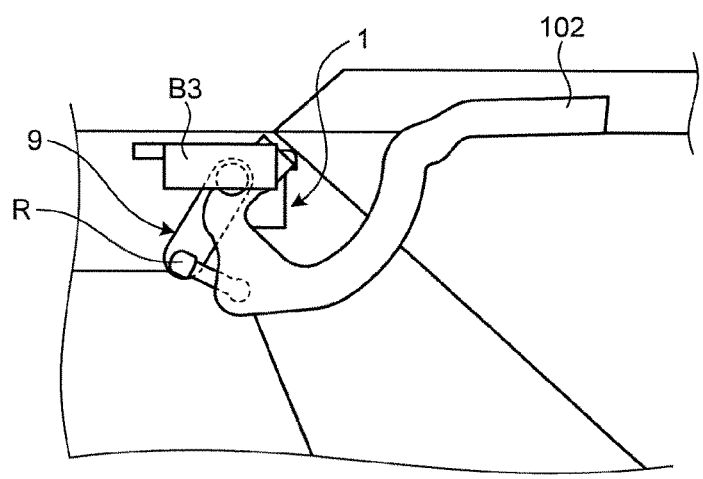
FIG. 2B is a schematic of the installation example where the door opening/closing device according to the present embodiment is used to open and close the hatchback door.

The following describes an installation example where a door opening/closing device according to the present embodiment is mounted on a vehicle. The door opening/closing device according to the present embodiment is used to open and close a hatchback door with an upper hinge at a rear end opening of a vehicle main body in a vehicle, such as a four-wheel vehicle. FIGS. 1A, 1B, 2A, and 2B are schematics of an installation example where the door opening/closing device according to the present embodiment is used to open and close a hatchback door. FIGS. 1A and 1B illustrate a state where the hatchback door is closed, whereas FIGS. 2A and 2B illustrate a state where the hatchback door is opened. FIGS. 1A and 2A are general views of a rear part of a vehicle, whereas FIGS. 1B and 2B are partial enlarged views of FIGS. 1A and 2A, respectively.

Figure 3:
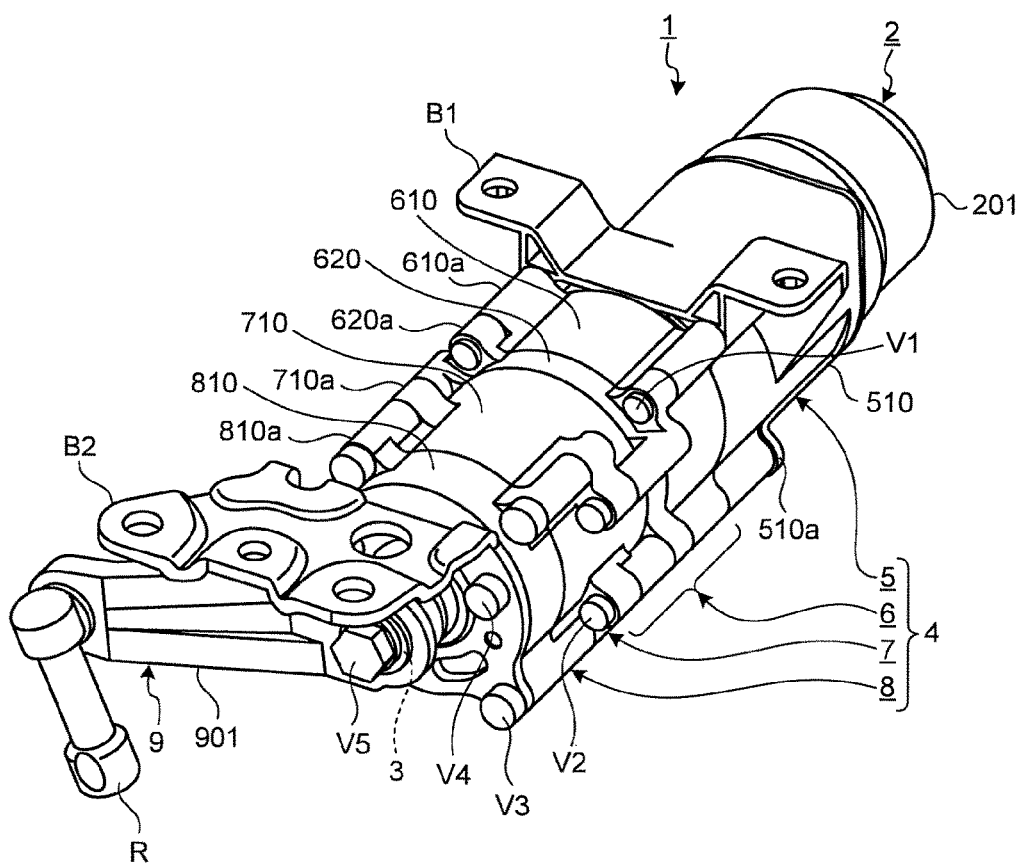
FIG. 3 is a schematic of a configuration of the door opening/closing device according to the present embodiment.

FIG. 3 is a schematic of a configuration of the door opening/closing device according to the present embodiment. As illustrated in FIG. 3, a door opening/closing device 1 includes a motor 2, an output shaft 3, and a deceleration mechanism 4 connected along the axial center of the output shaft 3. As illustrated in FIG. 3, the deceleration mechanism 4 includes a first planetary gear mechanism 5, a sensor mechanism 6, a second planetary gear mechanism 7, and a third planetary gear mechanism 8. The motor 2 and the sensor mechanism 6 are supplied with electricity from an on-vehicle power source.

As illustrated in FIGS. 1A and 2A, the door opening/closing device 1 according to the present embodiment is fixed to a ceiling of a vehicle 100 with the axial center of the output shaft 3 extending horizontally in the width direction of the vehicle 100. As illustrated in FIGS. 1B and 2B, an end of a rod R serving as an opening/closing member is connected to an arm 9 connected to the door opening/closing device 1. The other end of the rod R is connected to a hinge 102 serving as an opening/closing member. An end of the hinge 102 is fixed to the ceiling of the vehicle 100 with a bracket B3, whereas the other end of the hinge 102 is fixed to a hatchback door 101.

Figure 4:
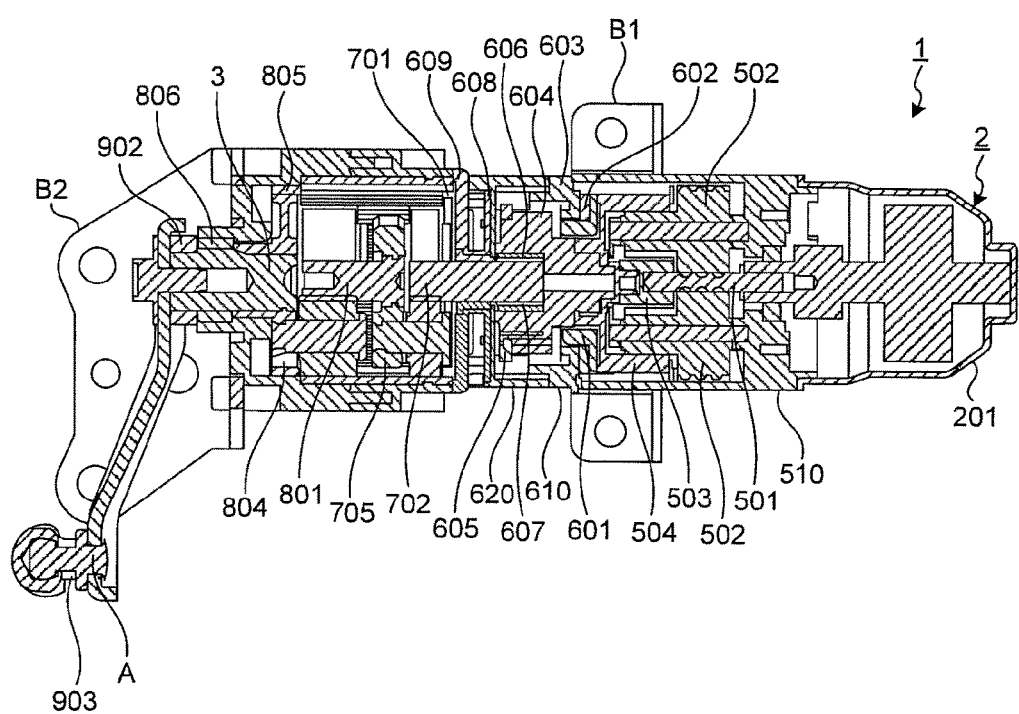
FIG. 4 is a sectional view along the axial center of an output shaft of the door opening/closing device illustrated in FIG. 3.
Figure 5:
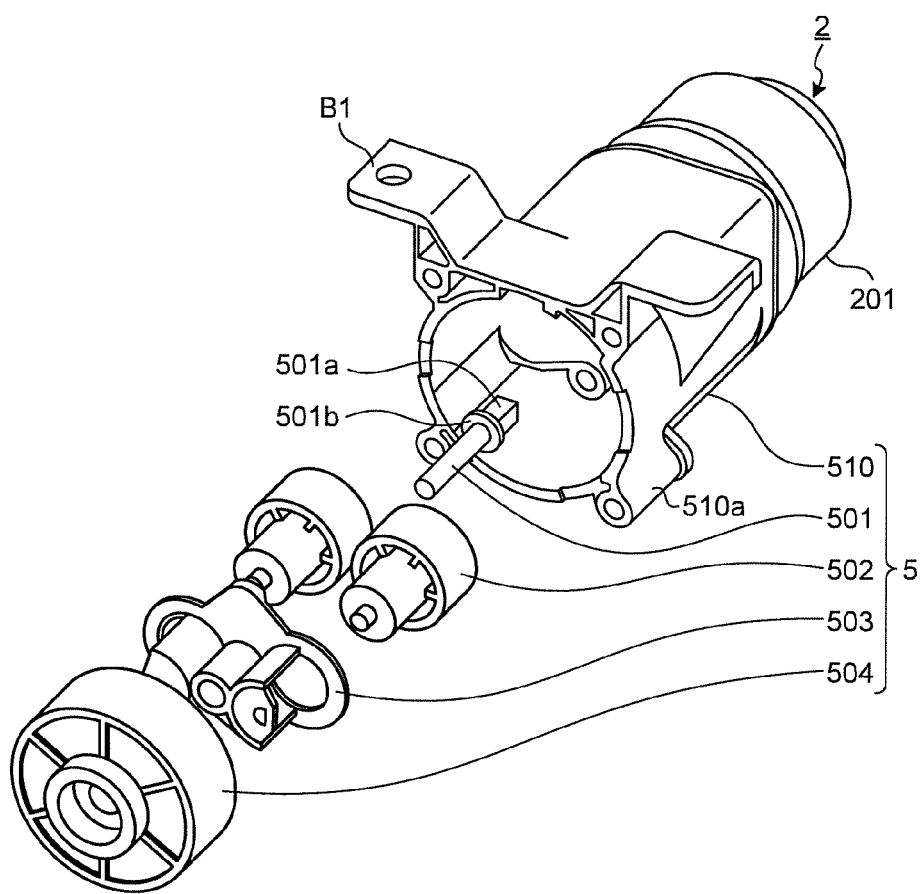
FIG. 5 is an exploded perspective view of a configuration of a first planetary gear mechanism in the door opening/closing device illustrated in FIG. 3.
Figure 6:
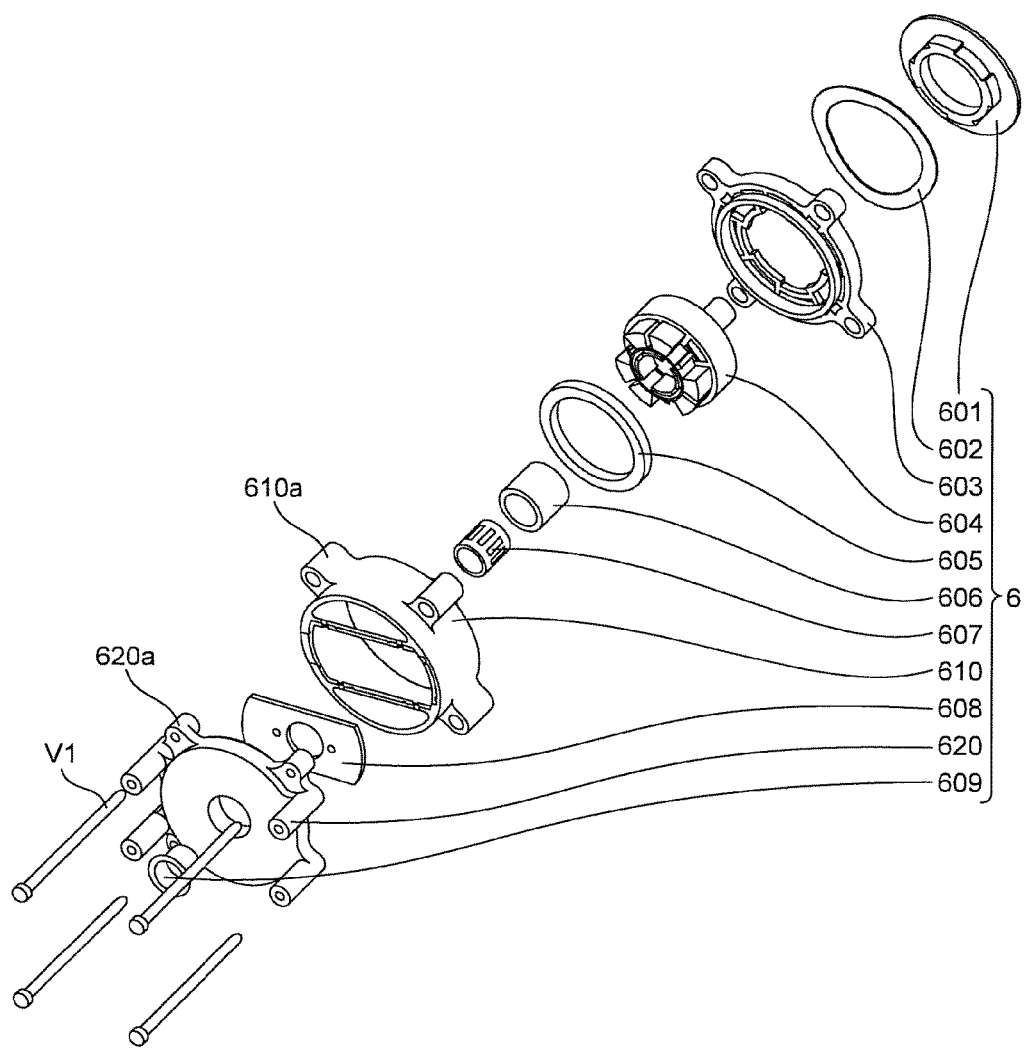
FIG. 6 is an exploded perspective view of a configuration of a sensor mechanism in the door opening/closing device illustrated in FIG. 3.
Figure 7:
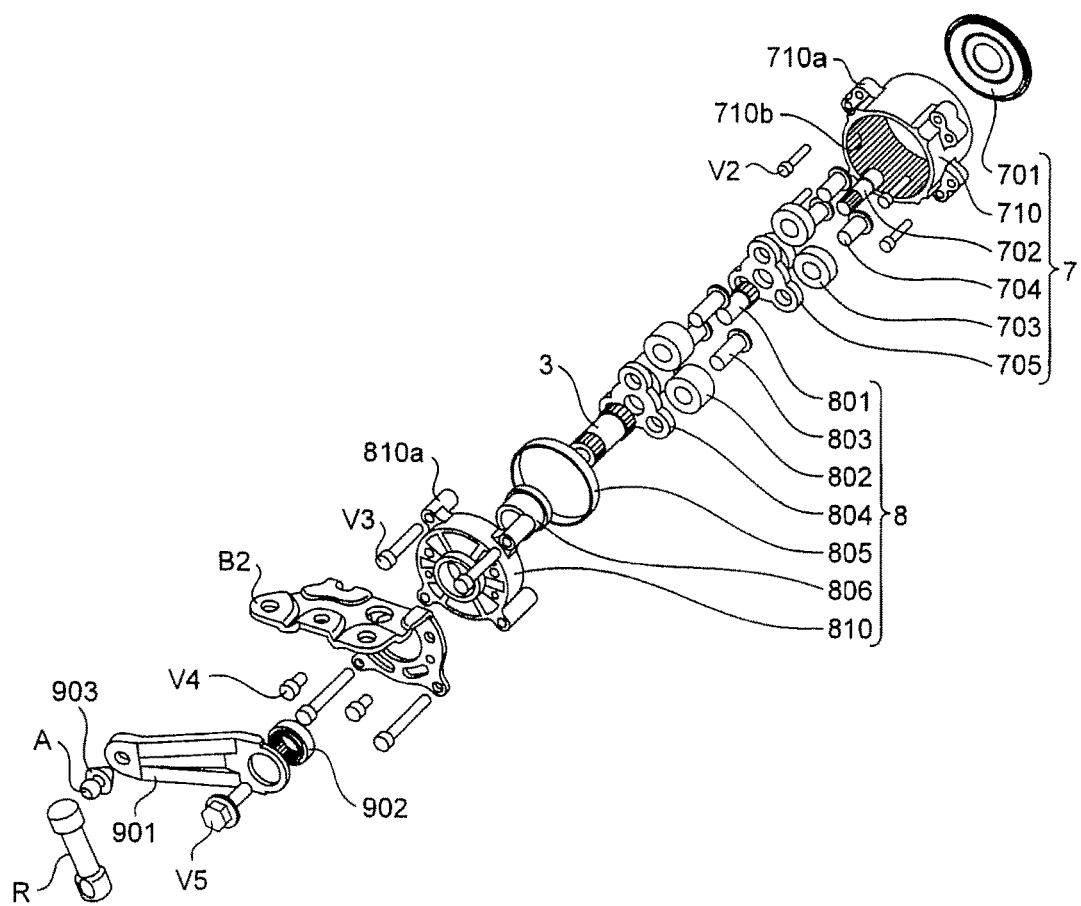
FIG. 7 is an exploded perspective view of a configuration of a second planetary gear mechanism, a third planetary gear mechanism, and an arm in the door opening/closing device illustrated in FIG. 3.

The following describes a specific configuration of the door opening/closing device 1 according to the embodiment of the present invention with reference to FIG. 3 and FIGS. 4 to 7. FIG. 4 is a sectional view along the axial center of the output shaft of the door opening/closing device illustrated in FIG. 3. FIG. 5 is an exploded perspective view of a configuration of the first planetary gear mechanism in the door opening/closing device illustrated in FIG. 3. FIG. 6 is an exploded perspective view of a configuration of the sensor mechanism in the door opening/closing device illustrated in FIG. 3. FIG. 7 is an exploded perspective view of a configuration of the second planetary gear mechanism, the third planetary gear mechanism, and the arm in the door opening/closing device illustrated in FIG. 3.

The motor 2 generates power to open and close a door and includes a rotor, an electromagnet, and other components, none of which is illustrated, in a cylindrical motor case 201 serving as a housing. The electromagnet is connected to the on-vehicle power source and is supplied with electricity. The output shaft 3 into which a bolt V5 is screwed outputs the power to open and close the door and is connected to a rotating shaft of the motor 2 via the deceleration mechanism 4. The output shaft 3 is provided with the arm 9 that connects the output shaft 3 and the door. The arm 9 is connected to the rod R and the hinge 102 illustrated in FIGS. 1B and 2B.

The deceleration mechanism 4 decelerates and transmits the power of the motor 2 to the output shaft 3. The first planetary gear mechanism 5, the sensor mechanism 6, the second planetary gear mechanism 7, and the third planetary gear mechanism 8 are arranged in this order from the motor 2 along the axial center of the output shaft 3.

As illustrated in FIG. 5, the first planetary gear mechanism 5 is a first deceleration mechanism that decelerates and outputs the power received from the motor 2. The first planetary gear mechanism 5 includes a first sun gear 501, first planetary gears 502, a first planetary carrier 503, and a rotatable first ring gear 504. These components are housed in a cylindrical gear case 510 serving as a housing member and function as a unit. The first planetary carrier 503 is fitted and fixed to the gear case 510. The gear case 510 is fixed to the motor case 201 by fixing fixing ears 510a formed on the outer peripheral surface to the motor case 201 with screws (not illustrated). The gear case 510 has a bracket B1 serving as a fixing unit used to fix the door opening/closing device 1 to the vehicle main body or the door. The first ring gear 504 is coupled to a magnet shaft 604 included in the sensor mechanism 6 by serration coupling (refer to FIG. 4).

The first sun gear 501 extending in the axis direction is connected to the motor 2 so as to be rotated by the drive of the motor 2. When the first sun gear 501 is rotated, the first planetary gears 502 are rotated. When the first planetary gears 502 are rotated, the first ring gear 504 is rotated because the first planetary carrier 503 is locked. When the first ring gear 504 is rotated, the magnet shaft 604 connected to the first ring gear 504 is rotated. As a result, the power received by the first sun gear 501 is decelerated and output from the magnet shaft 604.

As illustrated in FIG. 6, the sensor mechanism 6 detects driving conditions of the door opening/closing device 1. The sensor mechanism 6 includes a brake bush 601, a wave washer 602, a brake cover 603, the magnet shaft 604, a magnet ring 605, a collar 606, a tolerance ring 607, a giant magneto resistance effect (GMR) sensor 608, and a bush 609. These components are housed in sensor cases 610 and 620 and function as a unit. The sensor cases 610 and 620 are fixed to the motor case 201 by fixing fixing ears 610a and 620a formed on the outer peripheral surface to the motor case 201 with bolts V1.

The brake bush 601 is attached to the brake cover 603 with the wave washer 602 interposed therebetween. The magnet shaft 604 is fitted and fixed to the magnet ring 605. The magnet ring 605 is a plate ring member and is magnetized such that the S-pole and the N-pole are alternately arranged along the circumference. The GMR sensor 608 is fixed to the sensor case 620. The collar 606 is inserted into a recess formed on the output shaft 3 side in the magnet shaft 604. The tolerance ring 607 having a wave-shaped uneven portion is inserted into the collar 606. A second sun gear 702 (refer to FIG. 4) included in the second planetary gear mechanism 7 is inserted into the tolerance ring 607. Thus, the magnet shaft 604 is coupled to the second sun gear 702 by the pressing force of the tolerance ring 607. The bush 609 fills the gap between the sensor case 620 and the second sun gear 702.

The magnet shaft 604 is rotated by the power received from the first ring gear 504 of the first planetary gear mechanism 5. When the magnet shaft 604 is rotated, the magnet shaft 604 and the magnet ring 605 are integrally rotated. When the magnet ring 605 is rotated, the GMR sensor 608 detects magnetic flux density received from the magnet ring 605 and generates a pulse signal. By detecting the pulse signal generated in this manner with a pulse sensor, it is possible to detect the driving conditions of the door opening/closing device 1, specifically the rotation speed and the rotation direction. When the magnet shaft 604 is rotated, the second sun gear 702 coupled to the magnet shaft 604 is rotated.

As illustrated in FIG. 7, the second planetary gear mechanism 7 and the third planetary gear mechanism 8 configured as a two-stage planetary gear mechanism are a second deceleration mechanism that decelerates and outputs the power received from the first planetary gear mechanism 5 via the sensor mechanism 6.

The two-stage planetary gear mechanism includes a ring gear cover 701, the second sun gear 702, second planetary gears 703, pins 704, a second planetary carrier 705, a third sun gear 801, third planetary gears 802, pins 803, a third planetary carrier 804, a spacer 803, and a bush 806. These components are housed in cylindrical housing members of gear cases 710 and 810 and function as a unit. The gear case 710 includes therein a second ring gear 710b. The second ring gear 710b serves as a ring gear for both of the second planetary gear mechanism 7 and the third planetary gear mechanism 8.

The ring gear cover 701 is fitted into the gear case 710. The second sun gear 702 extending in the axis direction is coupled to the magnet shaft 604. The second planetary gears 703 are rotatably supported by the second planetary carrier 705 with the pins 704. The third sun gear 801 extending in the axis direction is coupled to the second planetary carrier 705 by serration coupling. The third planetary gears 802 are rotatably supported by the third planetary carrier 804 with the pins 803. The third planetary carrier 804 is connected to the output shaft 3 of the door opening/closing device 1. The spacer 805 fills the gap between the gear case 710 and the gear case 810. The bush 806 fills the gap between the gear case 810 and the output shaft 3. The gear case 710 is fixed to the sensor case 620 by fixing fixing ears 710a formed on the outer peripheral surface to the sensor case 620 with bolts V2. The gear case 810 is fixed to the gear case 710 by fixing fixing ears 810a formed on the outer peripheral surface to the gear case 710 with bolts V3. The gear case 810 is provided with a bracket B2 fixed thereto with bolts V4. The bracket B2 serves as a fixing unit used to fix the door opening/closing device 1 to the vehicle main body or the door.

When the second sun gear 702 is rotated by the power of the magnet shaft 604, the second planetary gears 703 are rotated. When the second planetary gears 703 are rotated, the second planetary carrier 705 is rotated because the second ring gear 710b formed inside the gear case 710 is not rotated. When the second planetary carrier 705 is rotated, the third sun gear 801 connected to the second planetary carrier 705 is rotated.

When the third sun gear 801 is rotated, the third planetary gears 802 are rotated. When the third planetary gears 802 are rotated, the third planetary carrier 804 is rotated because the second ring gear 710b formed inside the gear case 710 is not rotated. When the third planetary carrier 804 is rotated, the output shaft 3 connected to the third planetary carrier 804 is rotated. As a result, the power received by the second sun gear 702 is decelerated and output from the output shaft 3.

In the second planetary gear mechanism 7 and the third planetary gear mechanism 8, the second sun gear 702 and the third planetary carrier 804 (corresponding to the output shaft 3 in the door opening/closing device 1) are rotated about the axial center of the output shaft 3.

The output shaft 3 is a shaft arranged on the line extending from the axial center of the motor 2. The power of the motor 2 is transmitted to the output shaft 3 via the deceleration mechanism 4. The output shaft 3 is connected to an arm member 901 of the arm 9. The output shaft 3 outputs the power of the motor 2 received via the deceleration mechanism 4 to the arm 9.

The arm 9 includes the arm member 901, an arm spacer 902, a cushion 903, a shaft rod A, and the rod R. The arm 9 is connected to the rod R and the hinge 102 illustrated in FIGS. 1B and 2B to connect the output shaft 3 and the door. The arm 9 transmits the power of the output shaft 3 to the rod R and the hinge 102. The proximal end of the arm member 901 is fixed to the output shaft 3 with the bolt V5 with the arm spacer 902 interposed therebetween. The distal end of the arm member 901 is connected to the shaft rod A with the cushion 903 interposed therebetween. The shaft rod A is connected to the rod R with a clip (not illustrated).

The following describes an operation of the door opening/closing device 1 according to the present embodiment. As illustrated in FIGS. 1A and 2A, the door opening/closing device 1 performs an opening and closing operation of the hatchback door 101. When the motor 2 of the door opening/closing device 1 receives a pulse current at a predetermined frequency (pulse-width modulation (PWM) frequency) and a predetermined duty ratio from the on-vehicle power source, the motor 2 drives to rotate at a rotation rate corresponding to the duty ratio. As the duty ratio of the pulse current increases, the rotation rate of the motor 2 increases; whereas, as the duty ratio decreases, the rotation rate of the motor 2 decreases. Thus, PWM control is performed on the motor 2. The power of the driving motor 2 is transmitted to the output shaft 3 via the deceleration mechanism 4, thereby rotating the output shaft 3. When the output shaft 3 is rotated, the arm 9 is rotated about the output shaft 3 as illustrated in FIGS. 1B and 2B. Thus, the rod R and the hinge 102 are rotated in an interlocking manner, thereby opening and closing the hatchback door 101. The rotation direction of the motor 2 is switched depending on whether to open or close the hatchback door 101. The rotation direction of the motor 2 is switched by switching the direction of flow of the pulse current.

As described above, the door opening/closing device 1 includes the deceleration mechanism 4 and the output shaft 3. The deceleration mechanism 4 transmits the power of the motor 2 along the axial center of the output shaft 3. In the deceleration mechanism 4 and the output shaft 3, the axial centers of members arranged on the axial center of the output shaft 3 to transmit the power preferably coincide with the axial center of the output shaft 3 highly accurately. To position the axial centers of the members on the axial center of the output shaft 3, at least the axial center on an end surface of each member needs to be highly accurately aligned with the axial center on a datum plane orthogonal to the axial center of the member.

In the door opening/closing device 1 according to the present embodiment, the positional deviation on both end surfaces of the output shaft 3 is set to $\phi 0.03$, for example. The positional deviation of the output shaft 3 is preferably set to equal to or higher than $\phi 0.01$ and equal to or lower than $\phi 0.1$. As a result, the output shaft 3 can highly accurately transmit the power along the axial center of the output shaft 3. Thus, the door opening/closing device 1 according to the present embodiment has high output efficiency.

Similarly, the positional deviation of the first sun gear 501 is set to a predetermined value. As illustrated in FIG. 5, the first sun gear 501 includes a connection 501a and a flat plate 501b. The connection 501a has a square section and is arranged on the end on the motor 2 side, and the flat plate 501b is arranged adjacent to the connection 501a. In the first sun gear 501 of the door opening/closing device 1 according to the present embodiment, the positional deviation of the axial center on the end surface of the connection 501a on the motor 2 side with respect to the axial center on the surface of the flat plate 501b on the motor 2 side serving as a datum plane orthogonal to the axial center of the first sun gear 501 is set to $\phi 0.1$, for example. The positional deviation of the first sun gear 501 is preferably set to equal to or higher than $\phi 0.01$ and equal to or lower than $\phi 0.1$. As a result, the first sun gear 501 can highly accurately transmit the power along the axial center of the output shaft 3. Thus, the door opening/closing device 1 according to the present embodiment has high output efficiency.

Similarly, the coaxiality of the second sun gear 702 is set to a predetermined value. In the second sun gear 702 of the door opening/closing device 1 according to the present embodiment, the coaxiality of the axial center on the end surface of the second sun gear 702 on the side opposite to the motor 2 side with respect to the axial center on the end surface on the motor 2 side serving as a datum plane orthogonal to the axial center of the second sun gear 702 is set to $\phi 0.03$, for example. The positional deviation of the second sun gear 702 is preferably set to equal to or higher than $\phi 0.01$ and equal to or lower than $\phi 0.1$. As a result, the second sun gear 702 can highly accurately transmit the power along the axial center of the output shaft 3. Thus, the door opening/closing device 1 according to the present embodiment has high output efficiency.

As described above, the door opening/closing device 1 according to the present embodiment sets the positional deviation or the coaxiality of the axial center on at least one of the end surfaces of the output shaft 3 and the sun gears with respect to the axial center on the datum plane orthogonal to the axial center of the output shaft 3 and the sun gears to equal to or higher than $\phi 0.01$ and equal to or lower than $\phi 0.1$. Thus, it is possible to provide the door opening/closing device having high output efficiency.

The door opening/closing device 1 according to the present embodiment sets the positional deviation or the coaxiality of each member to the predetermined value. This configuration can prevent each member from being subjected to unnecessary force when the door opening/closing device 1 is driven, thereby achieving high long-term reliability.

Figure 8:
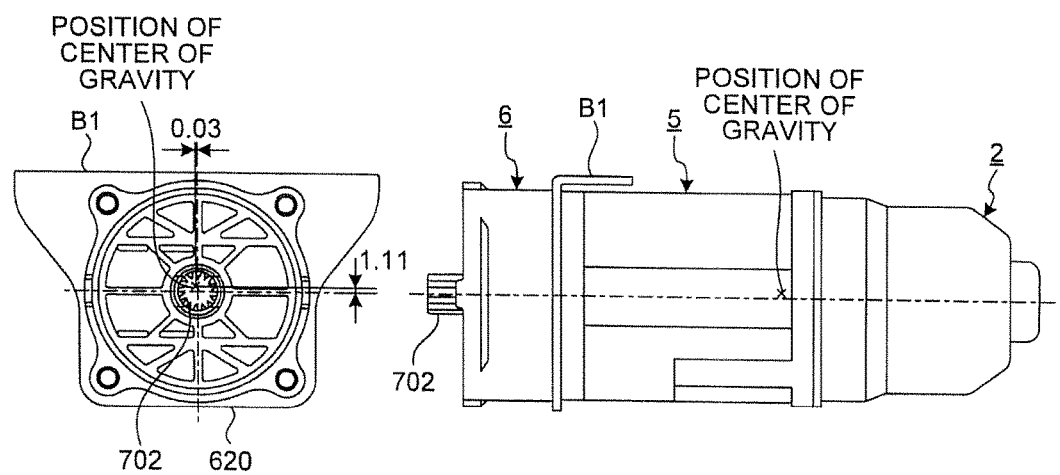
FIG. 8 is a schematic indicating the position of center of gravity when a motor and the first planetary gear mechanism are assembled in the door opening/closing device illustrated in FIG. 3.

The following describes the position of center of gravity when the units are assembled in the door opening/closing device 1. FIG. 8 is a schematic indicating the position of center of gravity when the motor and the first planetary gear mechanism are assembled in the door opening/closing device illustrated in FIG. 3. As illustrated in FIG. 8, the eccentric distance between the position of center of gravity when the motor 2 and the first planetary gear mechanism 5 are assembled and the axial center of the output shaft 3 is 0.03 mm in the horizontal direction and 1.11 mm in the vertical direction in FIG. 8. Both of the values are set smaller than one-tenth of the diameter (15 mm) of the output shaft 3. In the door opening/closing device 1 according to the present embodiment, the position of center of gravity and the eccentric distance were calculated using a measuring function of CATIA Version 5 Build Number 22 manufactured by Dassault Systemes.

Figure 9:
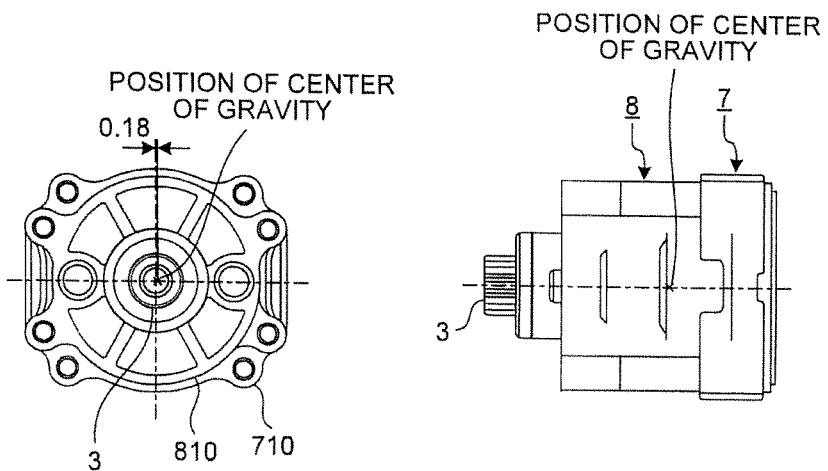
FIG. 9 is a schematic indicating the position of center of gravity when the second planetary gear mechanism and the third planetary gear mechanism are assembled in the door opening/closing device illustrated in FIG. 3.

FIG. 9 is a schematic indicating the position of center of gravity when the second planetary gear mechanism and the third planetary gear mechanism are assembled in the door opening/closing device illustrated in FIG. 3. As illustrated in FIG. 9, the eccentric distance between the position of center of gravity when the second planetary gear mechanism 7 and the third planetary gear mechanism 8 are assembled and the axial center of the output shaft 3 is 0.18 mm in the horizontal direction and 0.00 mm in the vertical direction in FIG. 9. Both of the values are set smaller than one-tenth of the diameter of the output shaft 3.

Figure 10:
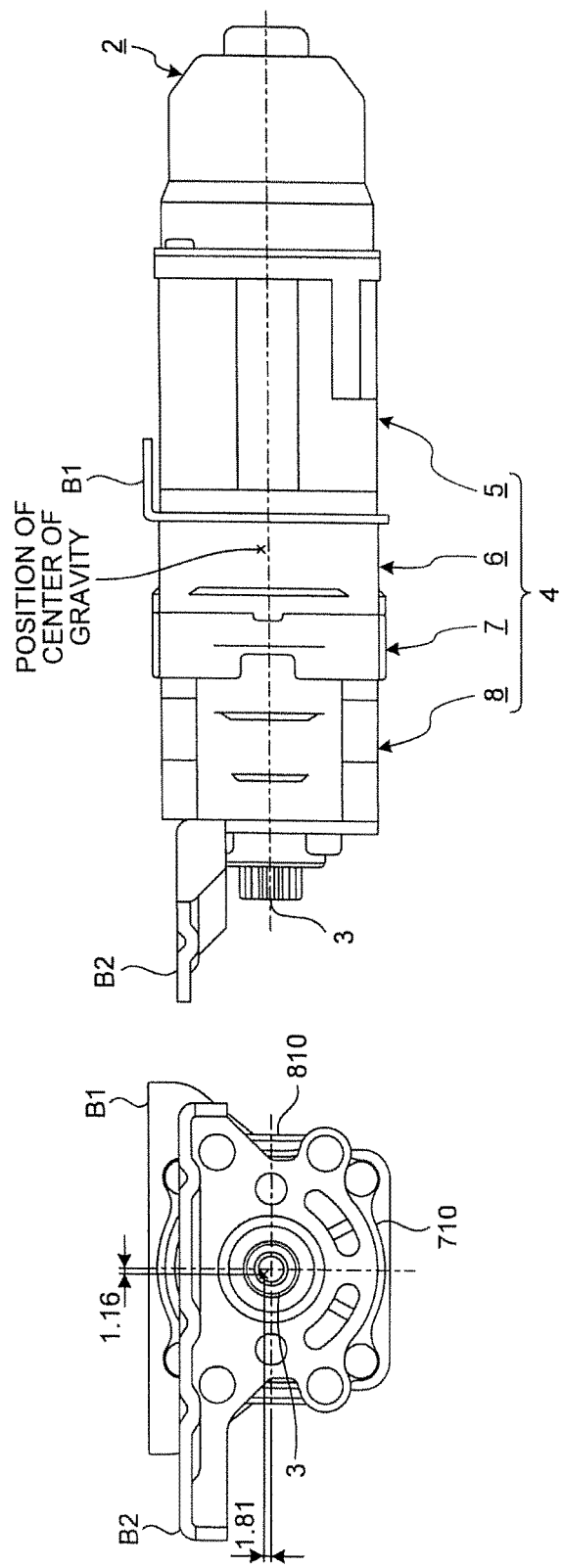
FIG. 10 is a schematic indicating the position of center of gravity when the motor, a deceleration mechanism, and the output shaft are assembled in the door opening/closing device illustrated in FIG. 3.

FIG. 10 is a schematic indicating the position of center of gravity when the motor, the deceleration mechanism, and the output shaft are assembled in the door opening/closing device illustrated in FIG. 3. As illustrated in FIG. 10, the eccentric distance between the position of center of gravity when the motor 2, the deceleration mechanism 4, and the output shaft 3 are assembled and the axial center of the output shaft 3 is 1.16 mm in the horizontal direction and 1.81 mm in the vertical direction in FIG. 10. Both of the values are set smaller than two-tenths of the diameter of the output shaft 3.

Figure 11:
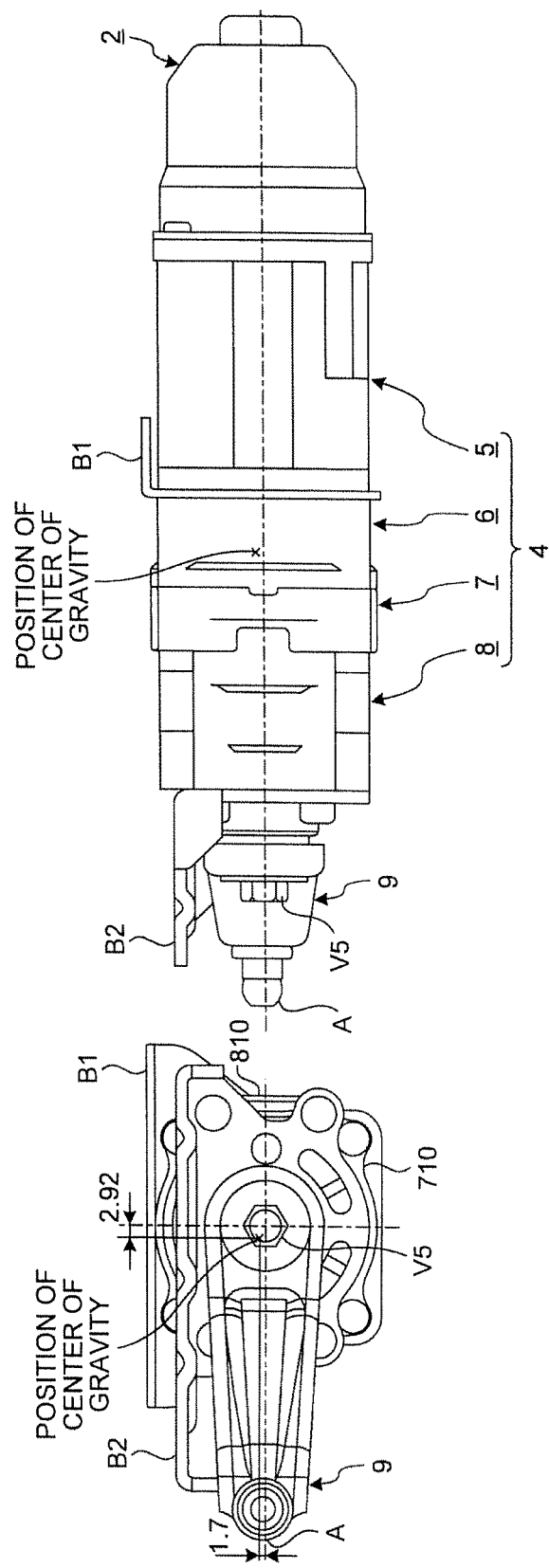
FIG. 11 is a schematic indicating the position of center of gravity when the motor, the deceleration mechanism, the output shaft, and the arm are assembled in the door opening/closing device illustrated in FIG. 3.

FIG. 11 is a schematic indicating the position of center of gravity when the motor, the deceleration mechanism, the output shaft, and the arm are assembled in the door opening/closing device illustrated in FIG. 3. As illustrated in FIG. 11, the eccentric distance between the position of center of gravity when the motor 2, the deceleration mechanism 4, the output shaft 3, and the arm 9 are assembled and the axial center of the output shaft 3 is 2.92 mm in the horizontal direction and 1.7 mm in the vertical direction in FIG. 11. Both of the values are set smaller than two-tenths of the diameter of the output shaft 3.

As described above, the door opening/closing device 1 according to the present embodiment sufficiently reduces the eccentric distance between the position of center of gravity when the units are assembled and the axial center of the output shaft 3. This results in suppression of a loss in the power of the motor 2, making it possible to efficiently output the power. Thus, the door opening/closing device 1 according to the present embodiment has high output efficiency.

The door opening/closing device 1 according to the present embodiment sufficiently reduces the eccentric distance between the position of center of gravity when the units are assembled and the axial center of the output shaft 3. This configuration can prevent each member from being subjected to unnecessary force when the door opening/closing device 1 is driven, thereby achieving high long-term reliability.

The door opening/closing device 1 according to the present embodiment can be used for opening and closing of a sliding door provided to the side of the vehicle 100 besides of the hatchback door 101.

Figure 12:
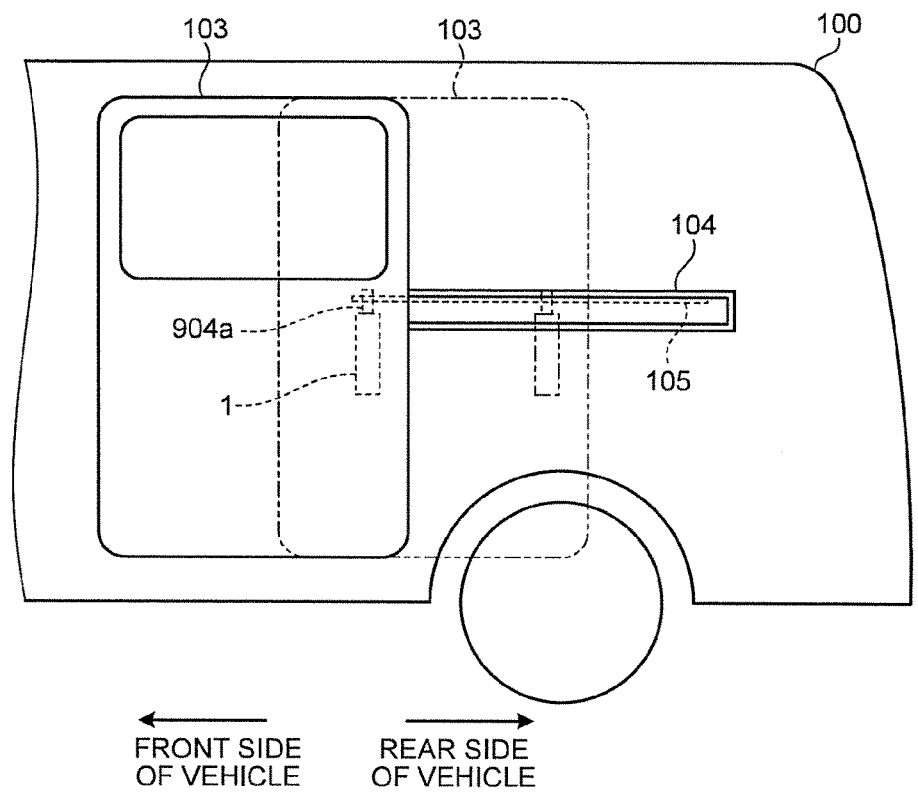
FIG. 12 is a schematic of an installation example where the door opening/closing device according to the present embodiment is used to open and close a sliding door.
Figure 13:
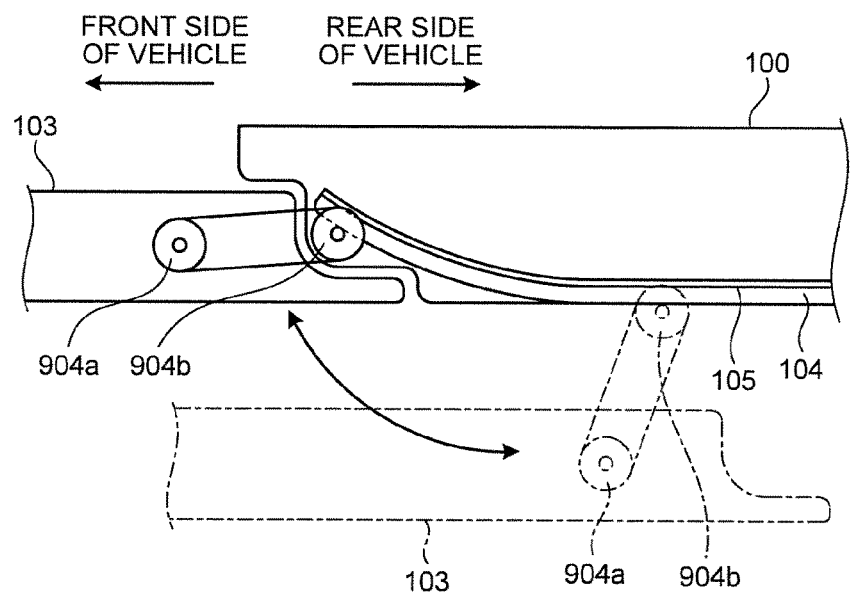
FIG. 13 is a schematic viewed from above the vehicle illustrated in FIG. 12.

FIG. 12 is a schematic of an installation example where the door opening/closing device according to the present embodiment is used to open and close a sliding door. FIG. 13 is a schematic viewed from above the vehicle illustrated in FIG. 12. A sliding door 103 moves in the directions forward and rearward the vehicle along a guide rail 104 provided to the vehicle 100. In a case where the door opening/closing device 1 according to the present embodiment is used to open and close the sliding door 103, the door opening/closing device 1 is arranged inside the sliding door 103 as illustrated in FIG. 12, for example. The door opening/closing device 1 is arranged with the direction of the rotation axis of the output shaft 3 extending along the vertical direction of the vehicle. The output shaft 3 is provided with a first rotating drum 904a. The first rotating drum 904a is attached so as to rotate about the rotation axis of the output shaft 3. To open and close the sliding door 103 using the door opening/closing device 1, a cable 105 provided along the guide rail 104 is wound and fed by the first rotating drum 904a and a second rotating drum 904b. Thus, the sliding door 103 moves along the guide rail 104.

Also in a case where the door opening/closing device 1 according to the present embodiment is provided to the sliding door 103, the positional deviation on both end surfaces of the output shaft 3 is set to equal to or higher than $\phi 0.01$ and equal to or lower than $\phi 0.1$. Thus, it is possible to provide the door opening/closing device having high output efficiency.

As described above, the door opening/closing device 1 according to the present embodiment has high output efficiency.

The first planetary gear mechanism 5, the second planetary gear mechanism 7, and the third planetary gear mechanism 8 do not necessarily have the configuration described above and may have another configuration. It is possible to optionally determine which part is fixed and which part is rotatably provided among the components constituting the planetary gear mechanisms. The deceleration mechanism connected to the motor 2 is not limited to a planetary gear mechanism and may be a cycloidal deceleration mechanism or a deceleration mechanism provided with a spur gear, for example. The deceleration mechanism is not limited to a three-stage mechanism and may be a zero- to two-stage mechanism or a multi-stage mechanism of four stages or more.

The door opening/closing device 1 may include a clutch mechanism. While the clutch mechanism is an electromagnetic clutch, for example, it may have another configuration. The door opening/closing device 1 may include a brake mechanism. While the brake mechanism is a spring brake, for example, it may have another configuration.

The output shaft 3 may be provided with a universal joint, an axis-direction converting mechanism, and a motion converting mechanism, for example. The universal joint can convert rotation of the output shaft 3 into rotation about a rotation axis in a direction different from that of the rotation axis of the output shaft 3. The axis-direction converting mechanism rotates about a rotation axis orthogonal to that of the output shaft 3. The motion converting mechanism converts a rotational motion output from the output shaft 3 into a linear motion along an axial center direction.

The embodiment above is not intended to limit the present invention. Aspects obtained by appropriately combining the components described above are included in the present invention. Other advantageous effects and modifications are easily conceivable by those skilled in the art. Thus, a broader range of aspects according to the present invention are not limited to the embodiment above, and various changes can be made.

INDUSTRIAL APPLICABILITY

As described above, the door opening/closing device according to the present invention is effectively used to increase the output efficiency for a door of a vehicle.

REFERENCE SIGNS LIST 1 door opening/closing device
100 vehicle
101 hatchback door
102 hinge
103 sliding door
104 guide rail
105 cable
2 motor
201 motor case
3 output shaft
4 transmission mechanism
5 first planetary gear mechanism
501 first sun gear
501a connection
501b flat plate
502 first planetary gear
503 first planetary carrier
504 first ring gear
510, 710, 810 gear case
510a, 610a, 620a, 710a, 810a fixing ear 6 sensor mechanism
601 brake bush
602 wave washer
603 brake cover
604 magnet shaft
605 magnet ring
606 collar
607 tolerance ring
608 GMR sensor
609, 806 bush
610, 620 sensor case
7 second planetary gear mechanism
701 ring gear cover
702 second sun gear
703 second planetary gear
704, 803 pin
705 second planetary carrier
710b second ring gear
8 third planetary gear mechanism
801 third sun gear
802 third planetary gear
804 third planetary carrier
805 spacer
9 arm
901 arm member
902 arm spacer
903 cushion
904a first rotating drum
904b second rotating drum
A shaft rod
B1, B2, B3 bracket
R rod
V1, V2, V3, V4, V5 bolt

The invention claimed is:

1. A door opening/closing device comprising:
a motor; and
an output shaft arranged on a line extending from an axial center of the motor, power of the motor being transmitted to the output shaft via a gear train for deceleration, the door opening/closing device opening and closing a door via the output shaft by driving the motor, wherein
an eccentric distance between a position of center of gravity when the motor, the gear train, and the output shaft are assembled and an axial center of the output shaft is set smaller than two-tenths of a diameter of the output shaft.

2. The door opening/closing device according to claim 1, wherein
the gear train comprises a planetary gear train including a sun gear arranged on a line extending from the axial center of the output shaft, and
positional deviation or coaxiality of an axial center on at least one of end surfaces of the sun gear with respect to an axial center on a datum plane orthogonal to an axial center of the sun gear is set to equal to or higher than ϕ0.01 and equal to or lower than ϕ0.1.

3. The door opening/closing device according to claim 2, further comprising:
an arm configured to connect the door and the door opening/closing device, wherein
an eccentric distance between a position of center of gravity when the motor, the gear train, the output shaft, and the arm are assembled and the axial center of the output shaft is set smaller than two-tenths of the diameter of the output shaft.

4. The door opening/closing device according to claim 3, wherein
the gear train comprises a first planetary gear mechanism, a second planetary gear mechanism, and a third planetary gear mechanism that are configured to decelerate the power of the motor gradually and rotate the output shaft,
an eccentric distance between a position of center of gravity when the motor and the first planetary gear mechanism are assembled and the axial center of the output shaft is set smaller than one-tenth of the diameter of the output shaft, and
another eccentric distance between a position of center of gravity when the second planetary gear mechanism and the third planetary gear mechanism are assembled and the axial center of the output shaft is set smaller than one-tenth of the diameter of the output shaft.

5. The door opening/closing device according to claim 2, wherein
the gear train comprises a first planetary gear mechanism, a second planetary gear mechanism, and a third planetary gear mechanism that are configured to decelerate the power of the motor gradually and rotate the output shaft,
an eccentric distance between a position of center of gravity when the motor and the first planetary gear mechanism are assembled and the axial center of the output shaft is set smaller than one-tenth of the diameter of the output shaft, and
another eccentric distance between a position of center of gravity when the second planetary gear mechanism and the third planetary gear mechanism are assembled and the axial center of the output shaft is set smaller than one-tenth of the diameter of the output shaft.

6. The door opening/closing device according to claim 1, further comprising:
an arm configured to connect the door and the door opening/closing device, wherein
an eccentric distance between a position of center of gravity when the motor, the gear train, the output shaft, and the arm are assembled and the axial center of the output shaft is set smaller than two-tenths of the diameter of the output shaft.

7. The door opening/closing device according to claim 6, wherein
the gear train comprises a first planetary gear mechanism, a second planetary gear mechanism, and a third planetary gear mechanism that are configured to decelerate the power of the motor gradually and rotate the output shaft,
an eccentric distance between a position of center of gravity when the motor and the first planetary gear mechanism are assembled and the axial center of the output shaft is set smaller than one-tenth of the diameter of the output shaft, and
another eccentric distance between a position of center of gravity when the second planetary gear mechanism and the third planetary gear mechanism are assembled and the axial center of the output shaft is set smaller than one-tenth of the diameter of the output shaft.

8. The door opening/closing device according to claim 1, wherein
the gear train comprises a first planetary gear mechanism, a second planetary gear mechanism, and a third planetary gear mechanism that are configured to decelerate the power of the motor gradually and rotate the output shaft, an eccentric distance between a position of center of gravity when the motor and the first planetary gear mechanism are assembled and the axial center of the output shaft is set smaller than one-tenth of the diameter of the output shaft, and another eccentric distance between a position of center of gravity when the second planetary gear mechanism and the third planetary gear mechanism are assembled and the axial center of the output shaft is set smaller than one-tenth of the diameter of the output shaft.

\* \* \* \* \*